C. L. ZINSSMEISTER.
FLUID SEAL FOR STUFFING BOXES.
APPLICATION FILED APR. 25, 1917.
1,272,171.
Patented July 9, 1918.
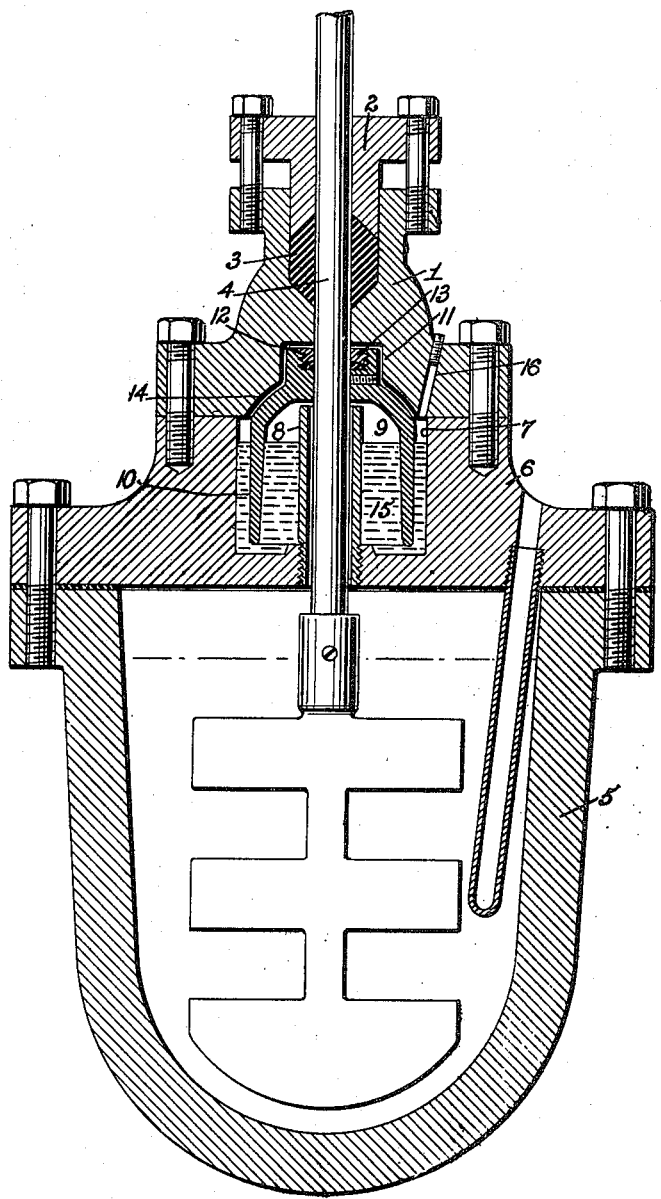

UNITED STATES PATENT OFFICE.

CARL LUTHER ZINSSMEISTER, OF NEWARK, NEW JERSEY.

FLUID SEAL FOR STUFFING-BOXES.

1,272,171.  Specification of Letters Patent.  Patented July 9, 1918.

Application filed April 25, 1917. Serial No. 164,586.

*To all whom it may concern:*

Be it known that I, CARL L. ZINSSMEISTER, a citizen of the United States, and a resident of Newark, in the county of Essex and State of New Jersey, have invented a new and Improved Fluid Seal for Stuffing-Boxes, of which the following is a full, clear, and exact description.

My invention relates to fluid seals for solid packings. It has reference more particularly to gas traps for autoclaves.

An object of the invention is to provide a simple and efficient trap for gases of low viscosity and injurious to standard packings used in connection with autoclaves.

Another object of the invention is to provide an autoclave packing equipped with means for receiving a fluid of high viscosity which intercepts the flow of the injurious gases to the normal packing and thereby prevents injury thereto and reduces the leakage through the solid packing.

With the above and other objects in view, the nature of which will more fully appear as the description proceeds, the invention consists in the novel construction, combination and arrangement of parts as herein fully described, illustrated and claimed.

In the accompanying drawing the figure represents a vertical section through an autoclave provided with a fluid seal embodying my invention.

Before proceeding to a more detailed description of the invention it must be clearly understood that although the fluid seal is shown and described in connection with an autoclave it is by no means limited in its application to this character of device.

Referring to the drawing, 1 is the stuffing box for which a packing gland 2 is provided and by means of which packing 3 is retained in the box 1 about a revoluble member 4 passing through the box into the vessel 5. The packing box 1 is supported by the cover 6 of the vessel to which it is secured by any suitable means. The cover 6 has a recess 7 concentric with the member 4. A sleeve 8 rises from the bottom of the recess 7 about the member 4 and forms for the member 4 an additional bearing. The sleeve 8 preferably rises above the top of the recess and transforms the recess into an annular cup 9 for which the base of the stuffing box forms a cover.

A bell 10 engages the cup 9. It is secured to the member 4 by a set screw 11 or any other suitable means. The top of the bell is preferably recessed to accommodate a packing gland 12 which would lock packing 13 about the member 4 and prevent gases coming from the vessel 5 through the sleeve 8 from passing between the juncture of the member 4 with the bell. The bottom of the stuffing box 1 which forms the cover for the cup is recessed, the recess having the configuration of the bell top.

The bell is so secured to the revoluble member 4 that a minimum clearance 14 is formed between the bell and the stuffing box. The cup is filled with a liquid or semi-liquid 15 have a high viscosity, preferably of a nature not materially affected by the gases of low viscosity which are generated in the vessel 5. As an example, cylinder oil charged with 25% of graphite, castor oil, or paraffin oil, etc., can be used in the cup. Under the high pressure generated in the vessel the gases of low viscosity flow through the sleeve and tend to displace the liquid 15 from the cup about the bell to the stuffing box 1, but in view of the small clearance 14 the resistance to flow is considerable, and in view of the high viscosity of the medium the gases are trapped and, therefore, prevented from flowing to the stuffing box and injuring the normal packing 3.

The stuffing box 1 is provided with a plugged aperture 16 leading to the recess 7 wherethrough the desired medium of low viscosity may be introduced.

While I have described the principle of operation, together with the device which I now consider to be the best embodiment thereof, I desire to have it understood that the device shown is merely illustrative and that such changes may be made as are within the scope of the appended claims.

I claim:

1. In combination with an autoclave having packing means, a revoluble member projecting through the packing into the autoclave, a cup surrounding the revoluble member below the packing and adapted to receive a medium of high viscosity, and means carried by the revoluble member and entering the cup for preventing a direct flow from the interior of the autoclave to the packing without passing through the medium in the cup.

2. In combination with a vessel having packing means, a revoluble member passing through the packing means into the vessel, an annular cup interposed between the vessel and the packing and coaxial with the revoluble member, said cup adapted to receive a medium of high viscosity, and a bell secured to the revoluble member adapted to engage the medium in the cup whereby the flow from the interior of the vessel to the packing means is intercepted by the medium in the cup.

3. In combination with a vessel having packing means, a revoluble member passing through the packing means into the vessel, an annular cup concentric with the revoluble member and forming an additional guide for said revoluble member, said cup being interposed between the stuffing box and the vessel, a bell in the annular cup secured to the revoluble member, and packing means for the bell and the revoluble member, said stuffing box and top of bell forming a clearance adapted to offer a high resistance to flow therethrough, substantially as and for the purpose set forth.

CARL LUTHER ZINSSMEISTER.